UNITED STATES PATENT OFFICE.

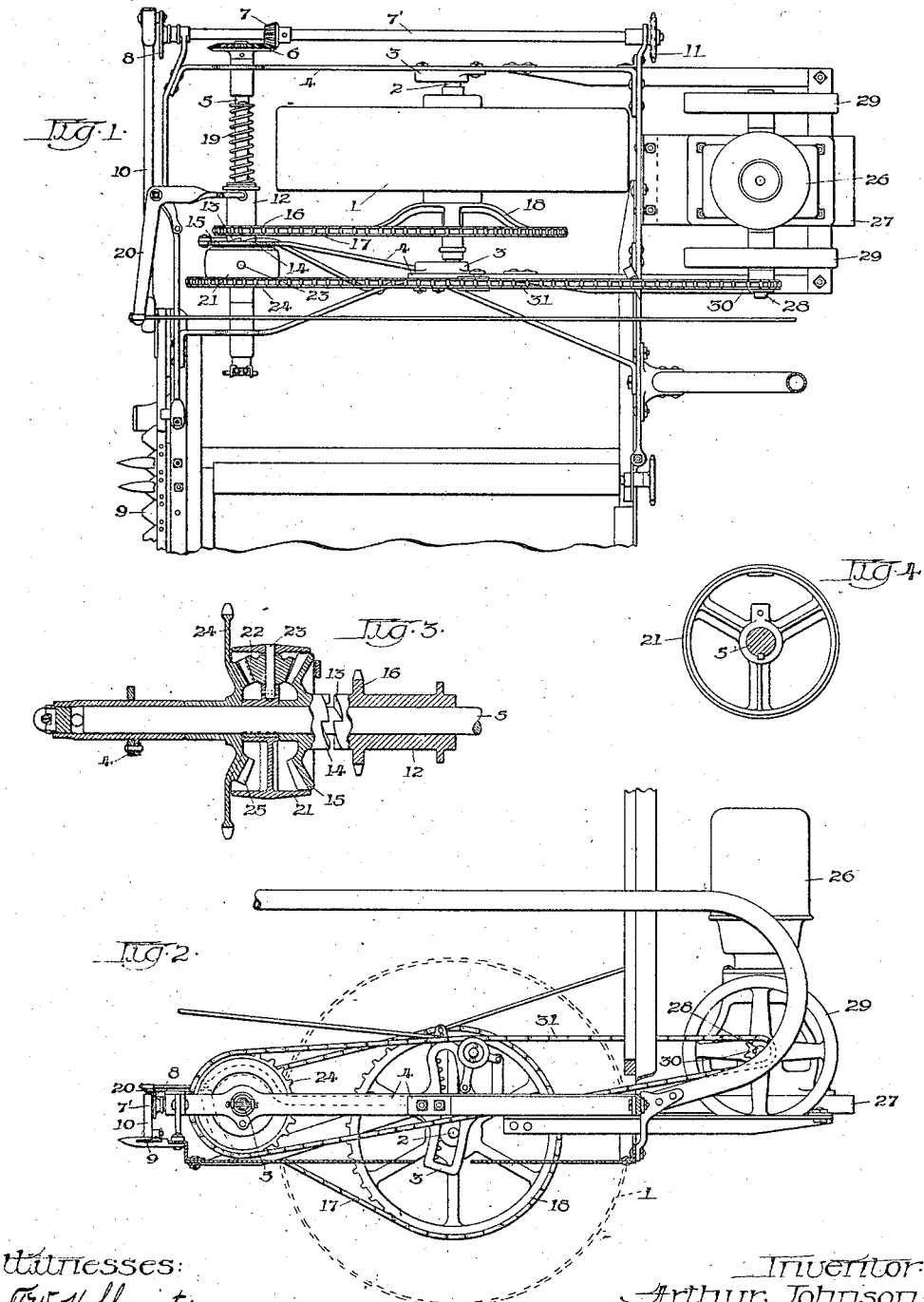

ARTHUR JOHNSON, OF CHICAGO, ILLINOIS, ASSIGNOR TO INTERNATIONAL HARVESTER COMPANY, A CORPORATION OF NEW JERSEY.

MOTOR ATTACHMENT FOR HARVESTING-MACHINES.

1,024,201.  Specification of Letters Patent.  Patented Apr. 23, 1912.

Application filed December 23, 1909. Serial No. 534,596.

*To all whom it may concern:*

Be it known that I, ARTHUR JOHNSON, a citizen of the United States, residing at Chicago, in the county of Cook and State of Illinois, have invented certain new and useful Improvements in Motor Attachments for Harvesting-Machines, of which the following is a specification.

My invention relates to harvesting machines having the usual traction wheel as a source of power that may be transmitted to other operative parts of the machine, and consists in providing a motor attachment supported upon the harvester frame and means for transmitting power therefrom to a power shaft having operative connection with the traction wheel, there being a differential gear connection between the two sources of power; the object of my invention being to provide an auxiliary source of power constantly available in a manner to assist the draft team or take the whole load, as circumstances may require. I attain this object by means of the mechanism illustrated by the accompanying drawings, in which—

Figure 1 is a top plan view of part of a harvester having my invention forming a part thereof; Fig. 2 is an end elevation of Fig. 1; Fig. 3 is a detail showing a longitudinal section of the differential gear connection between the traction wheel and the auxiliary motor; Fig. 4 is a detail of part of the differential gear.

The same reference numerals designate like parts throughout the several views.

1 represents the traction wheel mounted upon an axle 2 carried by side castings 3 secured to a wheel frame 4.

5 represents a cross shaft mounted upon the wheel frame in front of the wheel and having a bevel gear wheel 6 secured to its stubbleward end that engages with a pinion 7 secured to the longitudinally arranged shaft $7^1$ mounted upon the wheel frame and having at its forward end a crank wheel 8 connected with a cutting apparatus 9 by means of a pitman 10 and at its rear end a sprocket wheel 11 that may be connected with other operative parts of the machine. A sleeve 12 is slidably mounted upon the cross shaft 5 and is provided with clutch teeth 13 that are adapted to engage with corresponding teeth 14 formed on the hub of a bevel gear wheel 15 loosely mounted on the shaft. A sprocket wheel 16 is formed integral with the sleeve, and 17 represents a drive chain connecting the sprocket wheel with the main driving sprocket wheel 18 secured to the traction wheel. The clutch members are yieldingly held in engagement by means of a compression spring 19 surrounding the shaft and operative against the end of the sleeve, a forked lever 20 being mounted upon a fixed part of the frame and operative in a common way to disengage the clutch members.

21 represents a member of a common form of differential gear mechanism secured to the shaft 5 and provided with a pinion 22 rotatably mounted upon a radially arranged pin 23 connected with member 21 and meshing with gear wheel 15.

24 represents a large sprocket wheel rotatably mounted upon shaft 5 and having integral therewith a bevel gear member 25 that meshes with pinion 22 opposite the gear wheel 15.

26 represents a motor mounted upon the platform 27, secured to the wheel frame, and including a crank shaft 28 having fly wheels 29 and a sprocket wheel 30 secured thereto, and 31 represents a sprocket chain connecting sprocket wheels 30 and 24.

In the operation of the machine motion is transmitted from the traction wheel to the clutch sleeve 12, and through it to gear wheel 15, and at the same time the motor is transmitting its power in a manner to drive the sprocket wheel 24 and gear wheel 25 in the same direction, the two gear wheels being connected with the differential gear member 21 by means of pinion 22, the combined power of the motor and traction wheel is communicated to the cross shaft in a differential manner, the speed of the motor being governed in a manner to drive the operative parts of the machine at the proper speed when the draft team is advancing at a normal rate. If that rate be exceeded the traction wheel exerts more than its normal power to the engine, and if the rate be reduced the engine takes more of the load. Again, if the normal rate of advance of the team is exceeded, the speed of the operative parts of the harvester is increased proportionately, and if that rate is reduced it is also true that the speed of the operative parts is reduced; thus, if the team is standing, the power of the motor acts to drive the operative parts (with the proportions shown in the drawings) at half speed, and thus another point is gained. In order to clean the grain out of the machine while the team is standing, the effectiveness of the motor is doubled to perform this work.

What I claim as my invention, and desire to secure by Letters Patent, is:

1. A motor attachment for harvesting machines including, in combination, a wheeled frame, an axle, a traction wheel mounted upon said axle, a gear member secured to said traction wheel, a grain platform, a cutting apparatus carried by said grain platform, means for transmitting motion to said cutting apparatus, said motion transmitting means including a shaft mounted upon said wheeled frame, gearing connecting said shaft with the gear member secured to said traction wheel, a motor mounted on said wheeled frame, power transmitting means connecting said motor with said shaft, and an equalizing gear mechanism mounted upon said shaft and driven from both the motor and the traction wheel.

2. A motor attachment for harvesting machines including, in combination, a wheeled frame, an axle, a traction wheel mounted upon said axle, a sprocket wheel secured to said traction wheel, a grain platform, a cutting apparatus carried by said grain platform, means for transmitting motion to said cutting apparatus, said motion transmitting means including a transverse shaft mounted upon said wheeled frame, a sprocket wheel mounted upon said shaft and connected by a drive chain with the sprocket wheel secured to said traction wheel, a motor mounted upon said wheeled frame, a sprocket wheel deriving motion therefrom, a second sprocket wheel mounted upon said transverse shaft and connected by a drive chain with said motor driven wheel, and an equalizing gear connecting the two sprocket wheels mounted upon said transverse shaft and operative in a manner to transmit motion therethrough to said shaft.

3. A motor attachment for harvesters including, in combination, a wheeled frame, an axle, a traction wheel mounted upon said axle, a sprocket wheel secured to said traction wheel, a grain platform, a cutting apparatus carried by said grain platform, means for transmitting motion to said cutting apparatus, said motion transmitting means including a transverse shaft mounted in bearings upon said wheeled frame in front of said traction wheel, a sprocket wheel mounted upon said shaft and a driving chain connecting it with the sprocket wheel secured to said traction wheel, a motor mounted upon said wheeled frame, a sprocket wheel deriving motion therefrom, a second sprocket wheel mounted upon said transverse shaft, and a driving chain connecting it with said motor driven sprocket wheel, and an equalizing gear connection between the two sprocket wheels mounted upon said transverse shaft and operative in a manner to transmit motion therethrough to said shaft.

4. A motor attachment for harvesters including, in combination, a wheeled frame, an axle, a traction wheel mounted upon said axle, a sprocket wheel secured to said traction wheel, a grain platform, a cutting apparatus carried by said grain platform, means for transmitting motion to said cutting apparatus, said motion transmitting means including a cross shaft mounted upon said wheeled frame in front of said traction wheel, a supplemental platform supported on the rear of said wheeled frame, a motor mounted upon said platform, power transmitting means connecting said motor with said cross shaft including a sprocket wheel mounted upon said cross shaft, a second sprocket wheel mounted upon said cross shaft and connected by means of a power transmitting chain with the sprocket wheel secured to said traction wheel, and an equalizing gear connecting the two sprocket wheels mounted upon said cross shaft and operative in a manner to transmit motion therethrough to said shaft.

5. In combination with a harvesting machine including a traction wheel as the source of power, of a motor, equalizing gearing having one member rotatably connected with said motor, and having another member rotatably connected to said traction wheel, and means for transmitting power from said equalizing gearing to the operative parts of the harvester, whereby said parts may be operated by either or both sources of power, substantially as and for the purpose described.

6. In combination with a harvesting machine including a traction wheel as the source of power, of a motor suitably attached to said harvesting machine, equalizing gearing having one member rotatably connected with said motor, and having another member rotatably connected with said traction wheel, and means for transmitting power from said equalizing gearing to the operative parts of the harvester, whereby said parts may be operated by either or both sources of power, substantially as and for the purpose described.

7. In combination with a harvesting machine including a traction wheel as the source of power, of an auxiliary motor mounted on said harvesting machine, equalizing gearing having one member rotatably connected with said motor, and having another member rotatably connected with said traction wheel, and means for transmitting power from said equalizing gearing to the operative parts of the harvester, whereby said parts may be operated by either or both sources of power, substantially as and for the purpose described.

8. In combination with a harvesting machine including a traction wheel as the source of power, of an auxiliary motor, equalizing gearing having one member rotatably connected with said motor and having another member rotatably connected with said traction wheel, and means for transmitting power from said equalizing gearing to the operative parts of said harvester, whereby said parts may be operated by both sources of power with speeds proportionate to the rate of advance of the machine.

ARTHUR JOHNSON.

Witnesses:
HELEN E. WOLCOTT,
CHAS. H. CRAM.